Sept. 15, 1959 J. J. RONGEN 2,904,740

CIRCUIT ARRANGEMENT FOR CONVERTING LOW VOLTAGES INTO HIGH VOLTAGES

Filed Sept. 13, 1956

INVENTOR
JACOBUS JOHANNES RONGEN
BY Fred M. Vogel
AGENT

United States Patent Office 2,904,740

Patented Sept. 15, 1959

2,904,740

CIRCUIT ARRANGEMENT FOR CONVERTING LOW VOLTAGES INTO HIGH VOLTAGES

Jacobus Johannes Rongen, Eindhoven, Netherlands, assignor, by mesne assignments, to North American Philips Company, Inc., New York, N.Y., a corporation of Delaware Application September 13, 1956, Serial No. 609,576

Claims priority, application Netherlands June 19, 1956

7 Claims. (Cl. 321—2)

The present invention relates to circuit arrangements for converting low voltages to high voltages. More particularly, the invention relates to circuit arrangements for converting low voltages into high voltages by means of a transistor oscillator which is supplied with the low voltage and the output oscillations of which produce, after being rectified, the high voltage across a smoothing capacitor. It has been found that such circuit arrangements entail difficulties with regard to self-oscillation of the transistor oscillator, notably if said capacitor has a comparatively high value or the load supplied with the high voltage has a low impedance.

In accordance with the present invention, a switch is connected between the low-voltage source and the transistor oscillator. In its Off position, the switch supplies the low voltage to the smoothing capacitor in order to promote self-oscillation of the oscillator.

Figure 1:
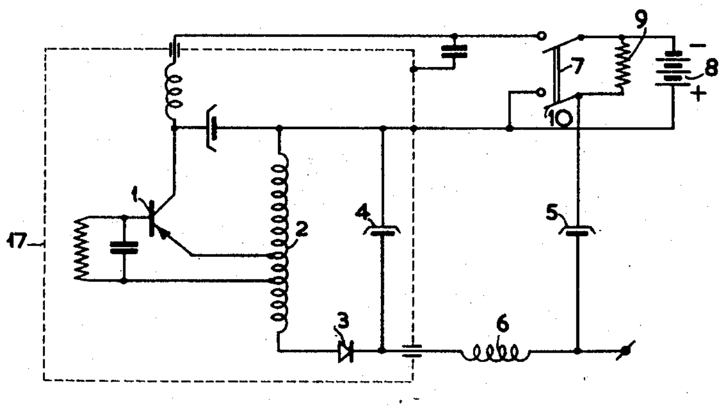
Figure 2:
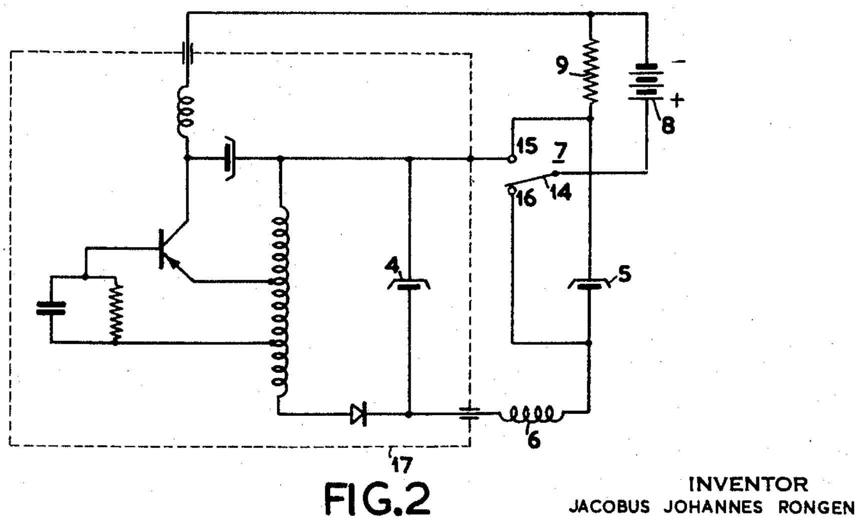

In order that the invention may be readily carried into effect, it will now be described in detail with reference to the accompanying drawing, in which Fig. 1 is a schematic diagram of an embodiment of the circuit arrangement of the present invention; and Fig. 2 is a modification of the embodiment of Fig. 1.

Fig. 1 represents a transistor oscillator comprising a transistor 1 which is fed back through an auto-transformer 2 in order to produce pulsatory oscillations which are supplied through a rectifier 3 to a smoothing filter comprising capacitors 4, 5 and an inductance 6. The circuit arrangement is so designed that the transistor is conductive during the major part of the time and non-conductive each time only during short intervals, during which intervals the pulses are produced with an energy many times exceeding the energy dissipated in the transistor.

However, since the transistor 1 exhibits a low initial mutual conductance, self-oscillation of the circuit arrangement involves difficulties which are probably caused by the fact that during the building-up time of the oscillator the capacitors 4, 5 constitute, via the rectifier a high load prohibiting building-up. In accordance with the invention this problem is solved by the provision of a switch 7 by means of which the low-voltage supply 8 for the transistor oscillator is connected into circuit. In its Off position, the switch supplies the low voltage from the source 8 to the capacitor 5 through a resistor 9, the elements 2, 3 and 6 then acting as a return conductor for this voltage.

Hence, in the Off position of the switch 7, the capacitor 5 will be charged to a voltage corresponding to that of the voltage supply 8. When the switch 7 is in its On position the terminal of the capacitor 5 connected to the resistor 9 is connected through the switch arm 10 to the other terminal of the supply 8. The capacitor 5 thus provides a bias by which the rectifier 3 is blocked, even after sharing its charge with the capacitor 4. Consequently, the oscillation, non-loaded by these capacitors, builds up until it reaches an amplitude corresponding to said bias, it subsequently being able further to build up gradually.

In the modification of Fig. 2, the switch 7 is of a type comprising a switch arm 14 and two contacts 15, 16, so that when the switch 7 is in its Off position, the voltage of the supply 8 reaches the capacitor 5 via the resistor 9 or via the arm 14 and the contact 16. When the switch 7 is in its On position, the terminal of the capacitor 5 connected to the resistor 9 is connected by way of contact 15 and arm 14 to the other terminal of the supply 8, the resistor 9 being naturally made so high as to withdraw a negligible power from the source 8.

The shielding means 17 and other elements in both figures serve for radiation- and noise-suppression of the oscillations produced by the oscillator. The switch elements particularly the switch 7, located outside the shielding means, then carry no high-frequency currents, so that radiation is avoided.

In a suitable construction, the capacitors 4 and 5 each had a value of 3.2 μF., an idnuctance 6 of 1 mh., a source 8 of 6 v. and a resistor 9 of 1 m., the impulse-repetition frequency of the oscillator being 5 kc./s.

What is claimed is:

1. A circuit arrangement for producing a high voltage from a low voltage source, comprising an oscillator system energized by said voltage source and comprising a transistor having input and output electrodes and transformer means interconnecting said electrodes in feedback relationship, means comprising a winding of said transformer for deriving high voltage pulses from said oscillator system, means for rectifying said high voltage pulses, a capacitor, means for producing the rectified high voltage pulses across said capacitor, and means for initiating the operation of said system comprising switching means connected to said capacitor and means connecting said switching means between said system and said voltage source in a manner whereby when said switching means is in one position the voltage of said low voltage source is applied to said capacitor thereby charging the said capacitor and facilitating initiation of operation of said system when said switching means is moved to another position.

2. A circuit arrangement for producing a high voltage from a low voltage source, comprising an oscillator system energized by said voltage source and comprising a transistor having input and output electrodes and transformer means interconnecting said electrodes in feedback relationship, means comprising a winding of said transformer for deriving high voltage pulses from said oscillator system, means for rectifying said high voltage pulses, a capacitor, means for producing the rectified high voltage pulses across said capacitor, and means for initiating the operation of said system comprising switching means connected to said capacitor, a resistor connected between said voltage source and said capacitor and means connecting said switching means between said system and said voltage source in a manner whereby when said switching means is in one position the voltage of said low voltage source is applied to said capacitor through said resistor thereby charging the said capacitor and facilitating initiation of operation of said system when said switching means is moved to another position and when said switching means is in said other position said voltage source is connected across said resistor.

3. A circuit arrangement for producing a high voltage from a low voltage source, comprising an oscillator system energized by said voltage source and comprising a transistor having input and output electrodes and transformer means interconnecting said electrodes in feedback relationship, means comprising a winding of said transformer for deriving high voltage pulses from said oscillator system, a capacitor having first and second terminals, means for producing said high voltage pulses across said capacitor comprising rectifying means coupled between said winding and the first terminal of said capacitor, and means for initiating the operation of said system comprising switching means, a resistor connected between a terminal of said voltage source and second terminal of said capacitor and means connecting the second terminal of said capacitor to the other terminal of said voltage source through said switching means whereby when said switching means is in one position the voltage of said low voltage source is applied to said capacitor through said resistor thereby charging the said capacitor and facilitating initiation of operation of said system when said switching means is moved to another position and when said switching means is in said other position said voltage source is connected across said resistor.

4. A circuit arrangement for producing a high voltage from a low voltage source having first and second terminals comprising an oscillator system energized by said voltage source and comprising a transistor having input and output electrodes and transformer means interconnecting said electrodes in feedback relationship, means comprising a winding of said transformer for deriving high voltage pulses from said oscillator system, a capacitor having first and second terminals, means producing said high voltage pulses across said capacitor comprising rectifying means coupled between said winding and the first terminal of said capacitor, and means for initiating the operation of said system comprising switching means having two conducting arms, means connecting one of said arms between said system and the first terminal of said voltage source, a resistor connected between said first terminal of said voltage source and the second terminal of said capacitor and means connecting the other of said arms between the second terminal of said voltage source and a point in the connection between said resistor and said first terminal of said voltage source whereby when said switching means is in its Off position the voltage of said low voltage source is applied to said capacitor through said resistor thereby charging the said capacitor and facilitating initiation of operation of said system when said switching means is moved to its On position and when said switching means is in its On position said voltage source is connected across said resistor.

5. A circuit arrangement for producing a high voltage from a low voltage source having first and second terminals, comprising an oscillator system energized by said voltage source and comprising a transistor having input and output electrodes and transformer means interconnecting said electrodes in feedback relationship, means comprising a winding of said transformer for deriving high voltage pulses from said oscillator system, a capacitor having first and second terminals, means producing said high voltage pulses across said capacitor comprising rectifying means coupled between said winding and the first terminal of said capacitor, and means for initiating the operation of said system comprising switching means having a conducting arm adapted to connect a first contact point to either of second and third contact points, means connecting said first contact point to said second terminal of said voltage source, means connecting said second contact point to the first terminal of said capacitor, means connecting said third contact point to the second terminal of said capacitor and to said system and a resistor connected between said first terminal of said voltage source and the second terminal of said capacitor whereby when said arm of said switching means contacts said second contact point the voltage of said low voltage source is applied to said capacitor through said resistor thereby charging said capacitor and facilitating initiation of operation of said system when the said arm is moved to contact said third contact point and when the said arm contacts the said third contact said voltage source is connected across said resistor.

6. A circuit arrangement for producing a high voltage from a low voltage source, comprising an oscillator system energized by said voltage source and comprising a transistor having input and output electrodes and transformer means interconnecting said electrodes in feedback relationship, means comprising a winding of said transformer for deriving high voltage pulses from said oscillator system, means for rectifying said high voltage pulses, means for smoothing the rectified high voltage pulses comprising a pair of capacitors and a choke coil interposed between said capacitors, means for producing the rectified high voltage pulses across said capacitors, and means for initiating the operation of said system comprising switching means connected to said capacitors and means connecting said switching means between said system and said voltage source in a manner whereby when said switching means is in one position the voltage of said low voltage source is applied to one of said capacitors thereby charging said one of said capacitors and facilitating initiation of operation of said system when said switching means is moved to another position and when said switching means is in said other position the charge on said one of said capacitors charges the other of said capacitors.

7. A circuit arrangement for producing a high voltage from a low voltage source, comprising an oscillator system energized by said voltage source, said oscillator system including a transistor having input and output electrodes, transformer means interconnecting said electrodes in feedback relationship, means comprising a winding of said transformer for deriving high voltage pulses from said transistor, means for rectifying said high voltage pulses, a filter comprising a capacitor connected to said rectifying means, and means for initiating operation of the circuit arrangement comprising switching means connected between said capacitor and said voltage source, said switching means in one position applying said low voltage to said capacitor and said switching means in another position allowing the accumulated charge on said capacitor to block said rectifying means to said high voltage pulses.

References Cited in the file of this patent

UNITED STATES PATENTS

| | | |
|---|---|---|
| 2,748,274 | Pearlman | May 29, 1956 |
| 2,780,767 | Janssen | Feb. 5, 1957 |
| 2,843,744 | Guyton | July 15, 1958 |